(12) United States Patent
Matsuura et al.

(10) Patent No.: US 10,305,072 B2
(45) Date of Patent: May 28, 2019

(54) HEAT-SEALABLE INSULATING FILM FOR SECONDARY BATTERY

(71) Applicants: Toray Advanced Film Co., Ltd., Tokyo (JP); Automotive Energy Supply Corporation, Zama (JP)

(72) Inventors: Youichi Matsuura, Takatsuki (JP); Yoshitaka Fukagai, Takatsuki (JP); Satoshi Yamada, Tokyo (JP); Etsuo Ogami, Zama (JP); Satoshi Okano, Zama (JP); Tomoyuki Ichikawa, Zama (JP)

(73) Assignees: Toray Advanced Film Co., Ltd. (JP); Automotive Energy Supply Corporation (JP)

( * ) Notice: Subject to any disclaimer, the term of this patent is extended or adjusted under 35 U.S.C. 154(b) by 281 days.

(21) Appl. No.: 15/250,976

(22) Filed: Aug. 30, 2016

(65) Prior Publication Data

US 2017/0033330 A1 Feb. 2, 2017

Related U.S. Application Data

(62) Division of application No. 13/881,869, filed as application No. PCT/JP2011/072145 on Sep. 28, 2011, now Pat. No. 9,461,289.

(30) Foreign Application Priority Data

Oct. 27, 2010 (JP) .................................. 2010-241418

(51) Int. Cl.
*H01M 2/04* (2006.01)
*H01M 2/08* (2006.01)
(Continued)

(52) U.S. Cl.
CPC ........... *H01M 2/0482* (2013.01); *H01M 2/08* (2013.01); *H01M 2/1653* (2013.01);
(Continued)

(58) Field of Classification Search
CPC ...... H01M 2/04; H01M 2/08; H01M 10/0525; H01M 10/058
See application file for complete search history.

(56) References Cited

U.S. PATENT DOCUMENTS 4,623,598 A 11/1986 Waki et al.
2003/0224242 A1* 12/2003 Kaito et al. ............. H01M 4/00
429/94

(Continued)

FOREIGN PATENT DOCUMENTS

JP 2004-095543 A 3/2004
JP 2004-259625 A 9/2004
(Continued)

OTHER PUBLICATIONS

Machine Translation of: JP 2004/095543A, Mochizuki et al., Mar. 25, 2004.*

*Primary Examiner* — Kenneth J Douyette
(74) *Attorney, Agent, or Firm* — DLA Piper LLP (US)

(57) ABSTRACT

A heat-sealable insulating film for installation in a secondary battery including a positive electrode member and a negative electrode member being formed from a collector foil and an active material layer formed to cover one end on the collector foil, wherein an adhesive layer is adhered by heat-sealing to cover at least a boundary of an exposed part of the collector foil and the active material layer of the positive electrode member or the negative electrode member, a peripheral edge of the positive electrode member or the negative electrode member has a cross-sectional surface including the collector foil and the insulating film, and the insulating film consists of at least two layers of a base (Continued)

material layer made of a polyolefin resin and the adhesive layer made of a polyolefin resin modified with an unsaturated carboxylic acid or a derivative thereof.

2 Claims, 3 Drawing Sheets

(51) Int. Cl.
| | |
|---|---|
| H01M 4/04 | (2006.01) |
| H01M 4/13 | (2010.01) |
| H01M 4/139 | (2010.01) |
| H01M 10/052 | (2010.01) |
| H01M 10/0566 | (2010.01) |
| H01M 10/058 | (2010.01) |
| H01M 2/16 | (2006.01) |
| H01M 4/66 | (2006.01) |
| H01M 10/0525 | (2010.01) |

(52) U.S. Cl.
CPC ........... *H01M 4/0404* (2013.01); *H01M 4/13* (2013.01); *H01M 4/139* (2013.01); *H01M 4/667* (2013.01); *H01M 4/668* (2013.01); *H01M 10/052* (2013.01); *H01M 10/058* (2013.01); *H01M 10/0525* (2013.01); *H01M 10/0566* (2013.01); *Y02E 60/122* (2013.01); *Y02P 70/54* (2015.11); *Y10T 29/49115* (2015.01)

(56) References Cited

U.S. PATENT DOCUMENTS

| | | | |
|---|---|---|---|
| 2008/0292952 A1* | 11/2008 | Yahagihara et al. | H01M 6/12 429/162 |
| 2009/0130407 A1 | 5/2009 | Hata | |
| 2009/0269664 A1 | 10/2009 | Kim | |
| 2009/0305145 A1 | 12/2009 | Kim et al. | |
| 2011/0159346 A1* | 6/2011 | Yamamoto | B32B 27/08 429/144 |

FOREIGN PATENT DOCUMENTS

| | | | | |
|---|---|---|---|---|
| JP | 2005-126452 | A | 5/2005 | |
| JP | 2006-019199 | A | 1/2006 | |
| JP | 2009-199960 | A | 9/2009 | |
| JP | 4440573 | B2 | 3/2010 | |
| WO | 2010026954 | A1 * | 3/2010 | H01M 2/16 |

* cited by examiner

HEAT-SEALABLE INSULATING FILM FOR SECONDARY BATTERY

TECHNICAL FIELD

This disclosure relates to a secondary battery, a method of manufacturing the secondary battery and, specifically, a heat-sealable insulating film for the secondary battery, where short circuits between electrodes are suppressed.

BACKGROUND

Since secondary batteries such as lithium-ion secondary battery become familiar and increase battery capacity, higher reliability is required for safety. JP 2009-199960 A discloses a lithium-ion secondary battery in which an insulating film having no ion permeability is placed at a position where a non-application part faces an application part of negative electrode active material. Such a lithium-ion secondary battery makes it possible to suppress intercalation of the electrolytic ion liquid to the negative electrode active material even after cycles of charge and discharge and to prevent the swelling and delamination. JP '960 discloses an example of an adhesive tape made of polyimide as an insulating film. As another example of such an adhesive tape, JP 2005-126452 A discloses an adhesive tape made by applying acrylic series or silicone series pressure-sensitive adhesive (hereinafter, referred to as PSA) to a film such as biaxially-oriented polypropylene film.

However, when such conventional insulating tapes are used to adhere, PSA of the insulating tape might stick to blades of a cutter in cutting the electrode with the insulating tape so that the PSA itself or neighbor foreign materials caught by the PSA might be mixed into the battery so as to affect the battery performance.

In view of the above-described problem, there is a need to provide a secondary battery, a method of manufacturing a secondary battery and insulating films where foreign materials are prevented from being mixed into the battery.

SUMMARY

We provide a heat-sealable insulating film for installation in a secondary battery including an outer housing and an electrode body including a positive electrode member, a separator member and a negative electrode member stacked in this order, the positive electrode member and the negative electrode member being formed from a collector foil and an active material layer formed to cover one end on the collector foil, wherein an adhesive layer is adhered by heat-sealing to cover at least a boundary of an exposed part of the collector foil and the active material layer of the positive electrode member or the negative electrode member, a peripheral edge of the positive electrode member or the negative electrode member has a cross-sectional surface including the collector foil and the insulating film, and the insulating film consists of at least two layers of a base material layer made of a polyolefin resin and the adhesive layer made of a polyolefin resin modified with an unsaturated carboxylic acid or a derivative thereof.

We also provide a heat-sealable insulating film consisting of at least two layers of a base material layer made of a polyolefin resin and an adhesive layer made of a polyolefin resin modified with an unsaturated carboxylic acid or a derivative thereof, adapted for installation in a secondary battery including an outer housing and an electrode body including a positive electrode member, a separator member and a negative electrode member stacked in this order, the positive electrode member and the negative electrode member being formed from a collector foil and an active material layer formed to cover one end on the collector foil, wherein the adhesive layer is adhered by heat-sealing to cover at least a boundary of an exposed part of the collector foil and the active material layer of the positive electrode member or the negative electrode member, and a peripheral edge of the positive electrode member or the negative electrode member has a cross-sectional surface including the collector foil and the insulating film.

BRIEF DESCRIPTION OF THE DRAWINGS

FIG. 2(A) is a plan view, FIG. 2(B) is a section view B-B of FIG. 2(A), and FIG. 2(C) is a section view C-C of FIG. 2(A).

FIGS. 3(A)-(D) are each manufacturing step.

EXPLANATION OF SYMBOLS

Figure 1:
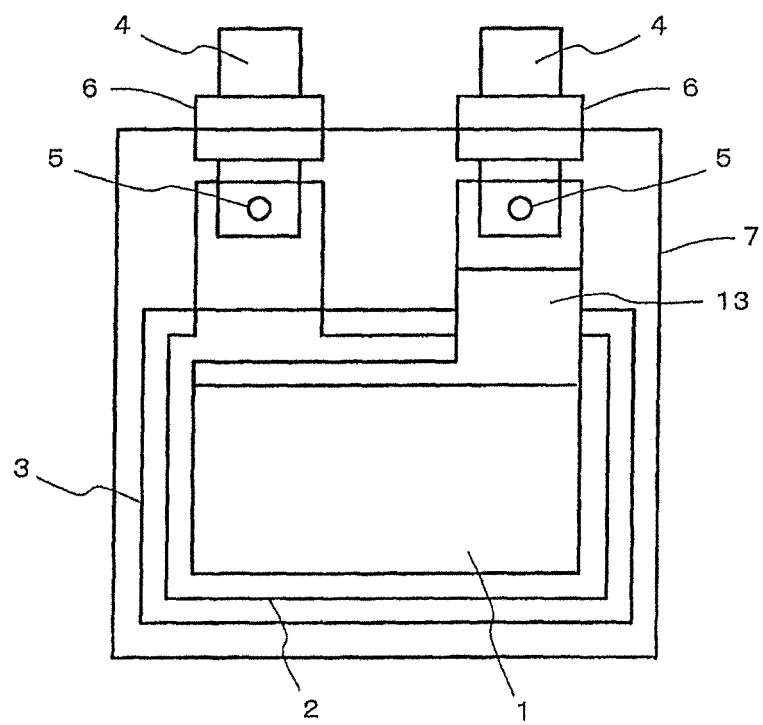
FIG. 1 is a top plan view showing an example of a composition of a lithium-ion secondary battery.

1: positive electrode member
2: negative electrode member
3: separator member
4: terminal member
5: connector
6: insulation resin layer
7: outer housing
10: collector foil
11: active material
12: lead part
13: heat-sealable insulating film

DETAILED DESCRIPTION

Our secondary battery accommodates in an outer housing an electrode body in which a positive electrode member, a separator member and a negative electrode member are stacked in this order, characterized in that the positive electrode member and the negative electrode member are formed from a collector and an active material layer formed to cover one end on the collector, an insulating body in which an insulating material that does not exhibit adhesiveness at room temperature is adhered with an adhesive strength of 1 N/15 mm or greater onto the collector constituting the positive electrode member or the negative electrode member, and a peripheral edge of the positive electrode member or the negative electrode member has a cross-sectional surface including the collector and the insulating body. In such a secondary battery, the insulating body that prevents short circuits inside the battery is made of the insulating material which does not exhibit any tackiness (adhesiveness) at room temperature. Therefore, when the collector is cut together with the insulating body to form the peripheral edge of the positive electrode member or the negative electrode member, foreign materials, which might be brought in by adhesive materials attached to a cutting die or a cutter blade, are effectively prevented from being mixed into the battery. The phrase "does not exhibit any tackiness at room temperature" implies that the insulating material does not adhere to an adherend under an ordinary work environment at 30° C. or lower temperature.

In the secondary battery, it is preferable that a terminal member connects to another end on the collector and a part of the terminal member is exposed outside the outer housing. Such a terminal member can make the electrode terminal structurally simple with fewer components.

It is preferable that the insulating body is made of a heat-sealable insulating film. More concretely, it is preferable that the heat-sealable insulating film has a base material layer made of a polyolefin such as polypropylene, and an adhesive layer made of a modified polyolefin such as polypropylene modified with an unsaturated carboxylic acid or a derivative thereof. The insulating body made of such materials makes it possible that the base material layer is effectively prevented from sticking to a hot plate of a heat sealer, while the adhesive layer is heat-sealed to the collector in a heat-sealing step of the secondary battery production process.

Further, it is preferable that the insulating body is heat-sealed to cover a boundary of an exposed surface of the collector and the active material layer. If the insulating body is heat-sealed on such a part, a cross-sectional surface made by laminating the collector, the active material layer and the insulating body in this order can easily be formed in a part of the peripheral edge of the positive electrode member such as a side facing to a lead part where the positive electrode terminal is provided so that the exposed area of the active material is maximized and the insulating body is effectively prevented from delaminating.

It is preferable that the secondary battery is made as a lithium-ion secondary battery made by injecting an electrolyte containing lithium ion into the outer housing. Further, it is preferable that the insulating body is adhered to the collector constituting the positive electrode member and the collector is made of aluminum. Our concepts can be applied to such a lithium-ion secondary battery having such an aluminum collector to provide a secondary battery having a stable battery performance.

Further, if an insulating body is heat-sealed at least on the collector and if the positive electrode member or the negative electrode member has a cross-sectional surface including at least the collector and the insulating body, foreign materials are prevented from sticking to blades of a cutter and contaminating the battery to affect the battery performance even when the collector provided with the insulating body is cut to be formed. Furthermore, the peeling resistance of the insulating body adhered to the collector can be improved even in an environment where the collector may contact the electrolyte.

We also provide a method of manufacturing a secondary battery which accommodates in an outer housing an electrode body in which a positive electrode member, a separator member and a negative electrode member are stacked in this order, characterized in that an active material is applied to a foil to form an active material layer which covers one end of the foil, and after an insulating body is adhered at least to an exposed surface of the foil the foil is cut so that a cross-sectional surface includes the insulating body to form the positive electrode member or the negative electrode member, and the foil is connected to one end of a terminal member and the electrode body is housed in the outer housing so that another end of the terminal member is exposed from the outer housing.

In such a method, when the collector is cut together with the insulating body, foreign materials, which might be brought in by PSA stuck to a cutting die or a cutter blade, are effectively prevented from being mixed into the battery.

It is preferable that, after the insulating body is adhered to cover a boundary of an exposed surface of the active material layer and the foil, the foil is cut to form the positive electrode member or the negative electrode member so that a cross-sectional surface includes a part laminating the insulating body and the active material layer, and an electrolyte is injected into the outer housing. The foil is cut under a condition where the insulating body firmly adheres to the foil or the active material to prevent the adhered part from delaminating at the time of cutting. Through the production process, a cross-sectional surface made by laminating the collector, the active material layer and the insulating body in this order can easily be formed in a part of the peripheral edge of the positive electrode member or the negative electrode member. And, therefore, the contact area between the active material and the electrolyte can be sufficiently ensured while effectively preventing the insulating body from delaminating.

Our secondary battery and manufacturing method make it possible that foreign materials are prevented from sticking to blades of a cutter and contaminating the battery to affect battery performance even when the collector provided with the insulating body is cut to be formed, Further, the peeling resistance of the insulating body adhered to the collector can be improved even in an environment where the collector may contact the electrolyte.

Furthermore, in the manufacturing method of the secondary battery, after the insulating body is adhered to the exposed surface of the foil, the collector is formed by cutting so that the cross-sectional surface includes the insulating body and the exposed surface area of the active material layer can be maximized to maintain the battery performance. Even under a condition where a shear stress is applied with a cutter to an adhered part between the insulating body and the active material layer, the insulating body can effectively be prevented from delaminating.

Turning now to the drawings, Symbol 1 illustrates a positive electrode member in FIG. 1, and active material for positive electrode is applied to both sides of a positive electrode collector foil as described later. Symbol 2 illustrates a negative electrode member having a broader area than positive electrode 1 in FIG. 1, and active material for negative electrode is applied to both sides of a negative elec-trode collector foil. Symbol 3 illustrates a separator member whose area is equal or broader than negative electrode member 2 and is positioned between the positive electrode and the negative electrode. Members 1-3 are stacked in the order corresponding to positive electrode member 1, separator member 3, negative electrode member 2, separator member 3, positive electrode member 1, separator member 3 and negative electrode member 2 (not shown in FIG. 1).

Symbol 4 illustrates a terminal member to be electrically connected via positive electrode member 1 to an external circuit (not shown) located outside an outer housing. Such a terminal member is provided at the negative electrode, too. Symbol 5 illustrates a connector that connects positive electrode member 1 and terminal member 4 by ultrasonic welding. Positive electrode member 1 is made by laminating a plurality of collector foils on terminal member 4 and then welding from both sides with ultrasonic waves. Symbol 6 illustrates a insulation resin layer formed around terminal member 4 to surround the width directional circumference of terminal member 4, as shown.

Symbol 7 illustrates an outer housing formed by heat-sealing at a circumference of two laminate film sheets. Outer housing 7 sandwiches terminal member 4 and insulation resin layer 6 on a side. In addition, an electrolyte is injected into outer housing 7 including positive electrode member 1, separator member 3, and negative electrode member 2.

Negative electrode member 1 shown in FIG. 2 comprises collector foil 10 and active material for positive electrode 11, and is provided with lead part 12 of the positive electrode collector foil as a part of collector foil 10. Lead part 12 of the positive electrode collector foil is identified as a rectangular part of (β+γ) mm long and Y mm wide. Although negative electrode member 2 is similar to positive electrode member 1, the size of negative electrode member 2 is larger and negative electrode collector foil lead part 12 is located at the left side of the figure.

Figure 2A:
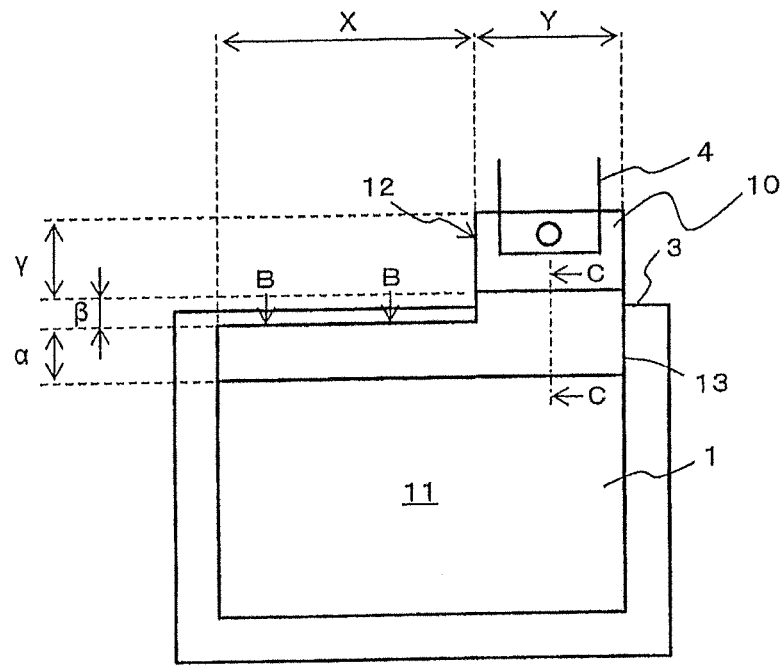
FIGS. 2(A)-2(C) show a composition of a positive electrode member constituting the lithium-ion secondary battery in FIG. 1, where

Further, heat-sealable insulating film 13 is formed in a reverse L shape shown in FIG. 2(A) on the surface of 1 positive electrode member 1. Heat-sealable insulating film 13 consists of the first region of α mm long and (X+Y) mm wide, and the second region of β mm long and Y mm wide. Furthermore, the end of separator member 3 is located to come to any longitudinal position in the second region.

Figure 2B:
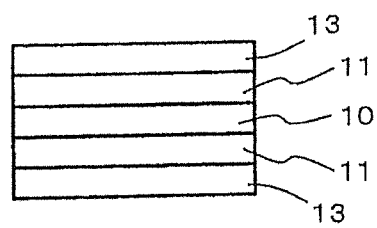

The B-B section shown in FIG. 2(B) has five laminated layers of heat-sealable insulating film 13, positive electrode active material 11, positive electrode collector foil 10, positive electrode active material 11 and heat-sealable insulating film 13 from the top. When a rectangular foil material to which a heat-sealable insulating tape is adhered is cut by an L-shape cutter or the like, to make positive electrode member 1, it is possible that the battery performance is improved by exposing the active material layer in an area as large as possible while keeping the size of the outer housing if such a five-layered exposed section is formed in the L-shape part consisting of a side (X mm long) of positive electrode member 1 and a side end part (β mm long) of lead part 12, where the side is facing lead part 12 and the side end part connects to an end of the side and extends in a direction perpendicular to the side.

Figure 2C:
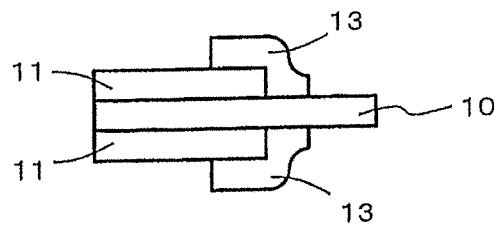

As shown in FIG. 2(C), an end of heat-sealable insulating film 13 is formed on positive electrode active material 11 and positive electrode collector foil 10 as covering an end of positive electrode active material 11. Alternatively, heat-scalable insulating film 13 may not be formed on positive electrode active material 11 and positive electrode collector foil 10. To prevent short circuits, heat-sealable insulating film 13 may be formed on positive electrode collector foil 10 only.

Figure 3A:
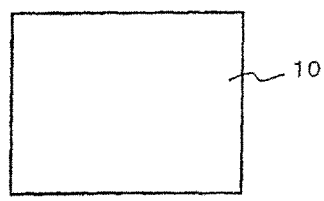
FIGS. 3(A)-3(D) are plan views showing a manufacturing process of the lithium-ion secondary battery in FIG. 1, where
Figure 3B:
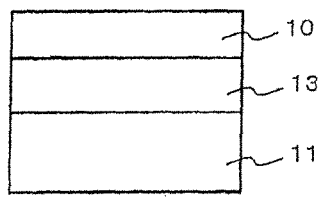
Figure 3C:
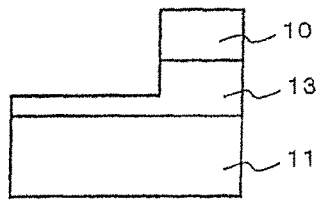

Hereinafter, a method of producing a lithium-ion secondary battery is explained by reference to FIG. 3. At first, positive electrode active material 11 is applied to positive electrode collector foil 10 (see FIG. 3(A)) and dried. Then, heat-sealable insulating film 13 is heat-sealed to cover the end of positive electrode active material 11 at temperature of 140° C. to 160° C. At this time, some area on the surface of positive electrode collector foil 10 should remain exposed by not adhering heat-sealable insulating film 13, as shown in FIG. 3(B). Next, positive electrode member 1 is shaped by cutting and leaving the first region and lead part 12 as shown in FIG. 3(C). Because heat-sealable insulating film 13 is made of insulating material which does not exhibit any tackiness (adhesiveness) at room temperature, heat-sealable insulating film 13 does not attach to the blades of the cutter even in cutting positive electrode member 1. Therefore, foreign substances are prevented from sticking to the blade of cutters and are effectively prevented from being mixed into the battery.

Similarly at the negative electrode side, negative electrode active material 11 is applied to negative electrode collector foil 10 and dried. Then, negative electrode member 2 is shaped by cutting with a cutter or the like. Negative electrode member 2, separator member 3 and positive electrode member 1 are stacked in this order and lead part 12 of collector foil 10 and terminal member 4 having insulation resin layer 6 are welded to make a battery component.

Figure 3D:
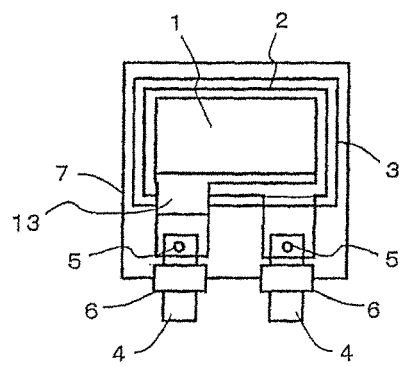

Next, the battery component is interposed between two laminated films, of which three sides are sealed. At this time, one of three sides to be sealed is heat-sealed between the two laminated films while an insulation layer surrounding the width directional circumference of terminal member 4 is interposed, as shown in FIG. 3(D).

Under a condition where one side is not heat-sealed, electrolyte is injected from the one side which is not sealed. After injecting the electrolyte, the one side is heat-sealed to seal up the inside. Then, after inspecting charge-discharge characteristics, a lithium-ion secondary battery is completed.

Heat-sealable insulating film 13 is explained in detail. Heat-sealable insulating film 13 is a composite film consisting of at least two layers of base material layer (a) and adhesive layer (b), where base material layer (a) is preferably made of polyolefin resin which is less soluble to the electrolyte and does not deteriorate the battery performance. Typical polyolefin resins are polyethylene and polypropylene (PP). It is preferable that the melting point of base material layer (a) is equal or higher than the melting point of adhesive layer (b) so that the base material layer is not stuck to a hot plate when heat-sealed with a hot plate type heat sealer. Above all, it is preferable that the base material layer (a) is made of polypropylene resin having a high melting point. The polypropylene resin may be a homo polypropylene resin (abbreviated to Homo PP) which is a homopolymer of propylene, a random copolymer resin (abbreviated to EPC) which is copolymerized with ethylene and a block copolymer resin (abbreviated to block PP) which is made by blending an elastomer component of the ethylene propylene copolymer on the molecular level during the polypropylene resin polymerization, for example. The melting point of EPC resin is around 140° C., and the melting points of homo PP and block PP are from 160° C. to 165° C. The polypropylene resin of the base material layer is more preferably homo PP or block PP to prevent it from sticking to the hot plate under the heat-seal temperature from 140° C. to 160° C.

To exhibit a good adhesive strength between adhesive layer (b) and the collector foil, the polyolefin resin of adhesive layer (b) should be modified with unsaturated carboxylic acid or its derivative. Though the modification amount is not limited, it is preferable that the adhesive strength to the collector is equal or greater than 10 N/15 mm so that heat-sealable insulating film 13 is prevented from delaminating in cutting with a cutter. It is preferable that the modification amount is equal or more than 0.01 wt % to achieve an adhesive strength over 10 N/15 mm under a condition of the heat-seal temperature from 140° C. to 160° C. and that the modification amount is equal or less than 4 wt % from a viewpoint of thermal stability in processing the film. For example, the unsaturated carboxylic acid or its derivatives may be an unsaturated monocarboxylic acid such as acrylic acid and methacrylic acid, an unsaturated dicarboxylic acid such as maleic acid, fumaric acid, itaconic acid and citraconic acid, maleic anhydride as anhydrides of them, anhydrous itaconic acid, anhydrous citraconic acid, acrylic acid ethyl as an ester of unsaturated monocarboxylic acid and alcohol, acrylic acid methyl, methyl methacrylate, acrylic acid butyl, and a mixture of them. "ADMER (trademark)" made by Mitsui Chemicals, Inc. and "MODIC (trademark)" made by Mitsubishi Chemical Corporation are known as commercial modified resins. The modified polyolefin resin includes resins such as polypropylene and polyethylene. If the resin of base material layer (a) is polypropylene series resin, it is preferable that the resin of adhesive layer (b) is modified to a polypropylene series resin which makes the interlayer adhesive strength greater.

A method of producing a polyolefin series resin composite film consisting of base material layer (a) and adhesive layer (b) may be a co-extrusion method such as the T-die method and the inflation method. There is also a method to stretch an extruded film, though the stretching might cause a crystallization by orientation to deteriorate the adhesion to the electrode active material and the metal foil, Therefore, it is preferable that the film is a non-oriented film having a double refraction rate less than $1 \times 10^{-2}$ as a parameter of orientation.

The melt flow rate of the resin, which forms the base material layer and the adhesive layer, is not specified as far as the film can be formed. From the viewpoint of film-forming stability, it is preferable that the melt flow rate (determined according to JIS K-7210 with propylene series polymer at 230° C., polyethylene series polymer at 190° C., and the load at 21.18 N) is 1-20 g/10 min. It is further preferable that the difference of both melt flow rates is less than 10 g/10 min. from the viewpoint of the stability in the co-extrusion of the base material layer and the adhesive layer.

Although the thickness of the polyolefin series resin composite film is not limited, from the viewpoint of film-forming stability, it is preferable that the film thickness is 20-100 μm. The thinner film thickness is preferable to prevent a part of the insulator overlapping the collector foil from increasing the film thickness so that the secondary battery capacity is increased by laminating more layers of the electrode.

If the thickness of adhesive layer (b) is less than 1 μm, the molten resin might flow out by the heat and the pressure of the heat-seal so that the thickness of adhesive layer (b) decreases so as to deteriorate the adhesion to the metal foil. Although the adhesive layer (b) should have a relatively great thickness, therefore, from a viewpoint of economic efficiency, it is preferable that the thickness of adhesive layer (b) is 1-10 μm.

It is preferable that the [melting point of base material layer (a)]≥the [melting point of adhesive layer (b)] so that base material layer (a) is prevented from sticking to the hot plate in the heat-sealing. It is more preferable that the heat-sealing is performed below the melting point of base material layer (a). If the adhesive layer resin is modified by functional groups, the heat-sealing can be achieved below the melting point. Therefore, if the adhesive layer is made of such a resin as polyolefin resin which has been grafted to modify with unsaturated carboxylic acid or the derivative, a firm adhesion can be achieved below the melting points of the base material layer and the adhesive layer without thermal deformation and sticking even if the melting point of the adhesive layer is close to the melting point of the base material. If base material layer (a) resin is homo polypropylene, it is preferable that adhesive layer (b) is made of resin modified by grafting unsaturated carboxylic acid or the derivative onto a random copolymer of which melting point is lowered by copolymerizing propylene with a component such as ethylene and butene.

It is possible that base material layer (a) or adhesive layer (b) contains a component such as an elastomer to improve the cold impact characteristics and the whitening on folding so long as the adhesion and the battery performance are not deteriorated.

It is possible that base material layer (a) or adhesive layer (b) contains an organic lubricant to lubricate the film as well as an organic or inorganic anti-blocking agent to prevent the blocking so long as the adhesion and the battery performance are not deteriorated.

If the resin of adhesive layer (b) is formed by itself and subjected to a dry laminate with a biaxially-oriented PP film or a biaxially-oriented polyester film by an adhesive, the production cost would become high and the adhesive would affect the battery performance. Therefore, it is preferable that the film is formed together with the base material layer.

EXAMPLES

Example 1

According to the production process shown in FIG. 3, a lithium-ion secondary battery is produced with a rolled aluminum foil as a positive electrode collector foil and with a electrolytic copper foil as a negative electrode collector foil. A positive electrode active material, which has been made with a base of $LiMn_2O_4$ and a binder of polyvinylidene fluoride (PVDF), is applied to the aluminum foil, dried, and formed through a roll-press process. A negative electrode active material, which has been made with a base of graphite and a binder of polyvinylidene fluoride, is applied to the electrolytic copper foil, dried and formed through the roll-press. An electrolyte is prepared by dissolving an electrolytic salt of $LiPF_6$ in a solvent of a mixed liquid based on diethyl carbonate and ethylene carbonate. A part of an insulating film attached to the aluminum foil is cut into a piece with 2 mm width. Then, the adhesive strength between the insulating film and the aluminum foil is determined at a peeling speed of 300 mm/min. with TENSILON produced by Orientec Co., Ltd. The determined value is calculated in terms of 15 mm width. Further, the insulating film is visually observed at the time of the heat-seal to determine if it has stuck to a seal bar. Cutter blades are visually observed after cutting the collector foil to determine if the PSA has stuck to the cutter blades.

In the insulating film, the base material layer is made of homo PP having a melting point of 161° C. according to DSC (Differential Scanning calorimeter), and the adhesive layer is made of a polypropylene series modified resin named "MODIC (trademark)" P614V made by Mitsubishi Chemical Corporation having a melting point of 121° C. according to DSC. The base material layer with 27 μm thickness and the adhesive layer with 3 μm thickness are co-extruded to make a composite film without adhesiveness at room temperature by T-die method. Table 1 shows the results of a lithium-ion secondary battery produced by heat-sealing the insulating film to the aluminum foil as the positive electrode collector foil at 150° C. In the results under this condition, adhesion to the aluminum foil is sufficient, battery performance is maintained, and no delamination in cutting and no sticking to the seal bar are observed.

TABLE 1

| | Base material layer resin/ Melting point [° C.] | Adhesive layer resin/Melting point [° C.] | Base material layer/Adhesive layer thickness [μm] | Heat-sealing Temperature [° C.] | Adhesive strength to aluminum foil [N/15 mm] | Sticking to seal bar | PSA sticking in cutting |
|---|---|---|---|---|---|---|---|
| Example 1 | Homo PP/163 | Low melting point modified resin/121 | 27/3 | 150 | 22 | OK [No sticking] | OK [No sticking] |
| Example 2 | Homo PP/163 | Low melting point modified resin/121 | 27/3 | 150 | 21 | OK-Δ | OK [No sticking] |
| Example 3 | Homo PP/163 | Homo PP modified resin/161 | 27/3 | 150 | 12 | OK-Δ | OK [No sticking] |
| Example 4 | Homo PP/163 | Low melting point modified resin/121 | 27/3 | 170 | 23 | Δ [Sticking tendency] | OK [No sticking] |
| Example 5 | Homo PP/163 | Low melting point modified resin/121 | 27/3 | 130 | 8 | OK [No sticking] | OK [No sticking] |
| Example 6 | EPC/140 | Low melting point modified resin/121 | 27/3 | 150 | 16 | Δ [Sticking tendency] | OK [No sticking] |
| Example 7 | Homo PP/163 | Homo PP modified resin/161 | 27/3 | 170 | 22 | Δ [Sticking tendency] | OK [No sticking] |
| Example 8 | EPC/140 | Low melting point modified resin/121 | 27/3 | 130 | 9 | OK-Δ | OK [No sticking] |
| Example 9 | Homo PP/163 | Low melting point modified resin/121 | 29/1 | 150 | 7-15 | OK [No sticking] | OK [No sticking] |
| Comparative Example 1 | Homo PP/163 | EPC/140 | 27/3 | 150 | 0 | — | — |
| Comparative Example 2 | Biaxially-oriented PP/165 | Acrylic adhesive/- | 20/5 | Crimped at room temperature | 8 | — | NG\[Stuck] |

Example 2

Table 1 shows a result of producing a lithium-ion secondary battery under a condition the same as Example 1 except that the base material layer of the insulating film is made of a block PP having a melting point of 161° C. according to DSC. In the result in this condition, adhesion to the aluminum foil is sufficient, battery performance is maintained, and no delamination in cutting is observed. However, a little tendency of sticking to the seal bar was observed. This insulating film as well as the films shown in Examples 3-9 and Comparative example 1 does not also exhibit adhesiveness at room temperature.

Example 3

Table 1 shows a result of producing a lithium-ion secondary battery under a condition the same as Example 1 except that the adhesive layer of the insulating film is made of MODIC (trademark) P555 produced by Mitsubishi Chemical Corporation having a melting point of 161° C. according to DSC. In the result in this condition, battery performance is maintained, and no delamination in cutting and no sticking to the seal bar are observed. However, adhesion to the aluminum foil tends to be insufficient.

Example 4

Table 1 shows the result of producing a lithium-ion secondary battery under a condition the same as Example 1 except that the heat-sealing of the insulating film to an aluminum foil as the positive electrode collector foil is performed at 170° C. In the result in this condition, adhesion to the aluminum foil is sufficient, battery performance is maintained and no delamination in cutting is observed. However, a little tendency of sticking to the seal bar was observed.

Example 5

Table 1 shows a result of producing a lithium-ion secondary battery under a condition the same as Example 1 except that the heat-sealing of the insulating film to an aluminum foil as the positive electrode collector foil is performed at 130° C. In the result in this condition, battery performance is maintained, and no delamination in cutting and no sticking to the seal bar are observed. However, adhesion to the aluminum foil tends to be insufficient.

Example 6

Table 1 shows a result of producing a lithium-ion secondary battery under a condition the same as Example 1 except that the base material layer is made of EPC having a melting point of 140° C. according to DSC. In the result in this condition, adhesion to the aluminum foil is sufficient, battery performance is maintained, and no delamination in cutting is observed. However, a little tendency of sticking to the seal bar was observed.

Example 7

Table 1 shows a result of producing a lithium-ion secondary battery under a condition almost the same as Example 1, but the insulating film is the same as Example 3 and the heat-sealing is performed at 170° C. In the result in this condition, adhesion to the aluminum foil is sufficient, battery performance is maintained, and no delamination in cutting is observed. However, a little tendency of sticking to the seal bar was observed.

Example 8

Table 1 shows a result of producing a lithium-ion secondary battery under a condition almost the same as Example 1, but the insulating film is the same as Example 6 and the heat-sealing is performed at 130° C. In the result in this condition, battery performance is maintained, and no delamination in cutting and no sticking to the seal bar are observed. However, adhesion to the aluminum foil tends to be insufficient.

Example 9

Table 1 shows a result of producing a lithium-ion secondary battery under a condition the same as Example 1 except that the thicknesses of the base material layer and the adhesive layer, which are the same as Example 1, are 29 μm and 1 μm. In the result in this condition, battery performance is maintained, no delamination in cutting and no sticking to the seal bar are observed. However, the adhesion to the aluminum foil tends to fluctuate.

Comparative Example 1

Table 1 shows a result of producing a lithium-ion secondary battery under a condition the same as Example 1 except that unmodified EPC resin is composed to the base material layer resin same as Example 1. In the result in this condition, adhesive strength to the aluminum foil is 0.2 N/15 mm being extremely weak, and delamination is caused in cutting.

Comparative Example 2

Table 1 shows a result of producing a lithium-ion secondary battery under a condition almost the same as Example 1, but an adhesive tape made by applying 5 μm thickness of acrylic PSA to 20 μm thickness of biaxially-oriented polypropylene film is adhered at room temperature. In the result in this condition, battery performance tends to deteriorate and the PSA tends to stick to cutter blades, although adhesion to the aluminum foil is at a sufficient level.

As to the Examples in Table 1, heat-sealing heat-sealable insulating film to the aluminum foil is performed to produce lithium-ion secondary batteries having a stable performance without sticking of PSA to the cutter.

In the Comparative Examples in Table 1, the PSA adhesive tape is stretched above the end face of the electrode active material and born down with a paster roll to attach. Because the tackiness (adhesiveness) of the PSA adhesive tape limits the speed of unwinding the tape, the attaching process takes time to achieve a close contact by a reciprocating roll and tends to cause crimp irregularity. In addition, the PSA adhesive tape roll often has only a short length so that there is a work loss when the tape is exchanged.

INDUSTRIAL APPLICATIONS

Our secondary battery, method of manufacturing the secondary battery and insulating films are applicable to the technical field of lithium-ion secondary batteries and the like.

The invention claimed is:

1. A heat-sealable insulating film for installation in a secondary battery comprising an outer housing and an electrode body comprising a positive electrode member, a separator member and a negative electrode member stacked in this order, the positive electrode member and the negative electrode member being formed from a collector foil and an active material layer formed to cover one end on the collector foil, wherein
   an adhesive layer is adhered by heat-sealing to cover at least a boundary of an exposed part of the collector foil and the active material layer of the positive electrode member or the negative electrode member,
   a peripheral edge of the positive electrode member or the negative electrode member has a cross-sectional surface including the collector foil and the insulating film,
   the insulating film consists of at least two layers of a base material layer having a melting point of 140 to 165° C. and made of a polyolefin resin and the adhesive layer having a melting point of 121 to 161° C. and made of a polyolefin resin modified with an unsaturated carboxylic acid or a derivative thereof, and
   the melting point of the base material layer is equal to or greater than the melting point of the adhesive layer.

2. A heat-sealable insulating film consisting of at least two layers of a base material layer having a melting point of 140 to 165° C. and made of a polyolefin resin and an adhesive layer having a melting point of 121 to 161° C. and made of a polyolefin resin modified with an unsaturated carboxylic acid or a derivative thereof, adapted for installation in a secondary battery comprising an outer housing and an electrode body comprising a positive electrode member, a separator member and a negative electrode member stacked in this order, the positive electrode member and the negative electrode member being formed from a collector foil and an active material layer formed to cover one end on the collector foil, wherein
   the adhesive layer is adhered by heat-sealing to cover at least a boundary of an exposed part of the collector foil and the active material layer of the positive electrode member or the negative electrode member,
   a peripheral edge of the positive electrode member or the negative electrode member has a cross-sectional surface including the collector foil and the insulating film,
   the insulating film consists of at least two layers of a base material layer having a melting point of 140 to 165° C. and made of a polyolefin resin and the adhesive layer having a melting point of 121 to 161° C. and made of a polyolefin resin modified with an unsaturated carboxylic acid or a derivative thereof, and
   the melting point of the base material layer is equal to or greater than the melting point of the adhesive layer.

* * * * *